(12) United States Patent
Cebull et al.

(10) Patent No.: US 12,030,014 B2
(45) Date of Patent: Jul. 9, 2024

(54) SYSTEM AND METHOD FOR TREATING GAS TO FUEL TURBINES

(71) Applicant: GTUIT, LLC, Billings, MT (US)

(72) Inventors: Brian R. Cebull, Billings, MT (US); Mark Peterson, Helena, MT (US); James L. Haider, Helena, MT (US); Austin Vandelinder, Billings, MT (US); Stephen Doll, Big Arm, MT (US)

( * ) Notice: Subject to any disclaimer, the term of this patent is extended or adjusted under 35 U.S.C. 154(b) by 444 days.

(21) Appl. No.: 17/570,268

(22) Filed: Jan. 6, 2022

(65) Prior Publication Data

US 2022/0219111 A1 Jul. 14, 2022

Related U.S. Application Data

(60) Provisional application No. 63/135,073, filed on Jan. 8, 2021.

(51) Int. Cl.
*B01D 53/02* (2006.01)
*B01D 46/00* (2022.01)
(Continued)

(52) U.S. Cl.
CPC ....... *B01D 53/1431* (2013.01); *B01D 46/003* (2013.01); *B01D 53/002* (2013.01); *B01D 53/18* (2013.01); *B01D 53/265* (2013.01); *C10L 3/106* (2013.01); *F02C 7/22* (2013.01); *C10L 2290/547* (2013.01)

(58) Field of Classification Search
CPC B01D 46/003; B01D 53/002; B01D 53/1431; B01D 53/18; B01D 53/265; C10L 2270/04; C10L 2290/46; C10L 2290/48; C10L 2290/547; C10L 3/101; C10L 3/106; F02C 7/22
See application file for complete search history.

(56) References Cited

U.S. PATENT DOCUMENTS 4,359,871 A 11/1982 Strass
5,245,110 A * 9/1993 Van Dijk ................ C01B 3/386
518/703

(Continued)

FOREIGN PATENT DOCUMENTS

CN 101948706 B 2/2013
CN 203319959 U 12/2013
(Continued)

*Primary Examiner* — Christopher P Jones
(74) *Attorney, Agent, or Firm* — Antoinette M. Tease

(57) ABSTRACT

A system and method for treating gas to fuel turbines by passing raw gas through an inlet pressure reducing valve to adjust the gas pressure and through a scrubber to capture liquids from the gas. Next, the gas is passed through a compressor to bring it to a pressure above that required by an inlet of a turbine and then to a post-compression aerial cooler that cools the gas to a temperature lower than a required dewpoint at fuel delivery pressure. Next, natural gas liquids are removed from the gas by passing it through a separator. A first portion of the cooled compressed gas is sent through a gas-to-gas heat exchanger, creating heated compressed gas, and a second portion of the cooled compressed gas passes through a backpressure valve. The heated compressed gas is blended with the second portion to create a fuel gas stream with a desired delivery temperature.

16 Claims, 7 Drawing Sheets

(51) Int. Cl.
  *B01D 53/00*   (2006.01)
  *B01D 53/14*   (2006.01)
  *B01D 53/18*   (2006.01)
  *B01D 53/26*   (2006.01)
  *C10L 3/10*    (2006.01)
  *F02C 7/22*    (2006.01)

(56) References Cited

U.S. PATENT DOCUMENTS

| | | | |
|---|---|---|---|
| 6,318,464 | B1 | 11/2001 | Mokrys |
| 10,000,704 | B2 | 6/2018 | Young et al. |
| 10,393,015 | B2 * | 8/2019 | Nagavarapu ............ F25J 3/0209 |
| 10,760,006 | B2 | 9/2020 | Dugas et al. |
| 10,852,060 | B2 | 12/2020 | Prim |
| 2010/0206542 | A1 | 8/2010 | Johnke et al. |
| 2012/0031144 | A1 * | 2/2012 | Northrop ............... F25J 3/0266 |
| | | | 62/617 |
| 2013/0098105 | A1 * | 4/2013 | Northrop .................. F25J 3/02 |
| | | | 62/617 |
| 2015/0292403 | A1 * | 10/2015 | Denton ................... F25J 3/061 |
| | | | 60/39.461 |
| 2018/0003342 | A1 | 1/2018 | Kunkel |
| 2018/0016977 | A1 * | 1/2018 | Nagavarapu ........... F25J 3/0645 |
| 2020/0051184 | A1 | 2/2020 | Barbour |
| 2021/0063082 | A1 | 3/2021 | Gallinelli et al. |
| 2022/0219111 | A1 * | 7/2022 | Cebull .................... C10L 3/106 |
| 2022/0228803 | A1 * | 7/2022 | Meyer ................. B01D 53/002 |

FOREIGN PATENT DOCUMENTS

| | | |
|---|---|---|
| CN | 106537072 A | 3/2017 |
| CN | 207779781 U | 8/2018 |

* cited by examiner

SYSTEM AND METHOD FOR TREATING GAS TO FUEL TURBINES

CROSS-REFERENCE TO RELATED APPLICATION

This application claims priority back to U.S. Patent Application No. 63/135,073 filed on Jan. 8, 2021, the contents of which are incorporated herein by reference.

BACKGROUND OF THE INVENTION

1. Field of the Invention

The present invention relates generally to the field of oil and gas, and more particularly, to a system and method for treating raw natural gas so that it can be used to fuel turbines.

2. Description of the Related Art

Historically, pumps, generators and other mechanical and electrical equipment have been powered by diesel-fired engines. More recently, a push to use cleaner burning, accessible, and less expensive natural gas has moved industry to develop engines and turbines which can run either entirely or in part on natural gas.

An example of gas that is being used to fuel turbines is associated gas or "rich" gas, which is a byproduct of the oil extraction process; it is "associated" with the oil being recovered from a well. Associated gas or rich gas, henceforth referred to as rich gas, can vary widely in chemical composition. These gases have become more abundant with increased production of oil and gas and may or may not have undergone some form of gas treatment. Rich gas tends to have a much higher energy content than typical high methane purity natural gas. The reason rich gas has more energy per standard cubic foot is because it contains longer chain hydrocarbons, also known as heavy hydrocarbons. These components include propane, butanes, pentanes, hexanes and other longer chain hydrocarbons. All of these components contribute to the "richness" of the gas, increasing the energy content, lowering the dewpoint, and increasing the chances of liquids condensing in the fuel stream.

Gas-fired turbines have existed for many years and have become increasingly popular in areas of oil and gas exploration and production, as well as power generation, which had previously been dominated by diesel engines. Turbine manufacturers have developed gas turbines that can work in combination with specialized electrical equipment to operate in place of diesel equipment in a wide variety of applications. To supply these turbines with gas, service providers and producers have relied on gas sources that are either piped or transported from gas processing facilities to the operating site where the turbine is located. The transported gas is typically trucked to the site in one of two forms—compressed natural gas (CNG) or liquified natural gas (LNG). Increasingly, many sites have nearby access to upstream infrastructure containing large volumes of untreated or undertreated gas. Unfortunately, this gas cannot be used directly in these turbines without first undergoing a form of treatment. Although turbines are more tolerant to rich gas than internal combustion engines, they are sensitive to the gaseous fuel liquefying or condensing in the fuel system. The goal of fuel treatment for a turbine is not to remove the heavy hydrocarbons entirely from the fuel stream but to control the dewpoint, pressure, and temperature of the gas to meet turbine specifications.

Increased energy content and water content in gaseous fuel often causes issues for turbines capable of burning gas. The primary issue with using untreated or undertreated natural gas in a turbine is the occurrence of liquids formation in the fuel system, which can damage the turbine and/or cause maintenance issues. Gas often will form liquids in the fuel system because turbines have a specific temperature and pressure range for fueling that often overlaps with the gas dewpoint (the point at which liquids begin to form in the gas). Water and longer chain hydrocarbons contained within untreated or undertreated natural gas are the typical cause and make untreated gas unusable as a fuel source. Gas treatment specifically tailored to remove longer chain hydrocarbons, water, and condition the gas for specific pressures and temperatures, above the dewpoint of the gas, is required.

BRIEF SUMMARY OF THE INVENTION

The present invention is a method for treating gas for the purpose of fueling turbines, the method comprising the steps of: providing a stream of raw gas; passing the stream of raw gas through an inlet pressure reducing valve that is configured to adjust the stream of raw gas to a pressure suitable for a compressor; passing the stream of raw gas through a scrubber that is configured to capture liquids from the stream of raw gas; passing the stream of raw gas through a compressor that is configured to bring the stream of raw gas to a pressure above that required by an inlet of a turbine to be fueled, thereby creating compressed gas; sending the compressed gas to a post-compression aerial cooler that is configured to cool the compressed gas to a temperature lower than a required dewpoint at fuel delivery pressure, thereby generating cooled compressed gas; removing natural gas liquids from the cooled compressed gas by passing the cooled compressed gas through a post-compression separator; sending a first portion of the cooled compressed gas through a gas-to-gas heat exchanger via a control valve, thereby creating heated compressed gas; sending a second portion of the cooled compressed gas through a first backpressure valve; and blending the heated compressed gas with the second portion of the cooled compressed gas to create a fuel gas stream with a desired delivery temperature.

In a preferred embodiment, the present invention further comprises the additional step of passing the stream of raw gas through an inlet aerial cooler that is configured to cool the stream of raw gas to an input temperature setpoint. In another preferred embodiment, the present invention further comprises the additional step of removing natural gas liquids from the stream of raw gas by passing the stream of raw gas through an inlet separator. In yet another preferred embodiment, the present invention further comprises the additional step of passing the fuel gas stream through a coalescing filter that is configured to remove liquids from the fuel gas stream.

In a preferred embodiment, the present invention further comprises the additional step of passing the fuel gas stream through a pressure reduction valve that is configured to set pressure of the fuel gas stream to that required by the inlet of the turbine to be fueled. In another preferred embodiment, the present invention further comprises the step of passing a portion of the fuel gas stream through a second backpressure valve that is configured to send the portion of the fuel gas stream back to the inlet pressure reducing valve. In yet another preferred embodiment, the present invention further comprises the step of removing liquids produced by the post-compression separator via a dump valve or dump. In yet another preferred embodiment, the present invention further comprises the step of removing liquids produced by the inlet separator via a dump valve or dump.

The present invention is a system for treating gas tor the purpose of fueling turbines comprising: an inlet pressure reducing valve that is configured to adjust pressure of a stream of raw gas to a pressure suitable for a compressor; a scrubber that is configured to capture liquids from the stream of raw gas; a compressor that is configured to bring the stream of raw gas to a pressure above that required by an inlet of a turbine to be fueled, thereby creating compressed gas; a post-compression aerial cooler that is configured to cool the compressed gas to a temperature lower than a required dewpoint at fuel delivery pressure, thereby generating cooled compressed gas; a post-compression separator that is configured to remove natural gas liquids from the cooled compressed gas; a gas-to-gas heat exchanger that is configured to heat a first portion of the cooled compressed gas, thereby creating heated compressed gas; a first backpressure valve that is configured to receive a second portion of the cooled compressed gas; and tubing that is configured to blend the heated compressed gas with the second portion of the cooled compressed gas to create a fuel gas stream with a desired delivery temperature.

In a preferred embodiment, the system further comprises an inlet aerial cooler that is configured to cool the stream of raw gas to an input temperature setpoint. In another preferred embodiment, the system further comprises an inlet separator that is configured to remove natural gas liquids from the stream of raw gas. In yet another preferred embodiment, the system further comprises a coalescing filter that is configured to remove liquids from the fuel gas stream.

In a preferred embodiment, the system further comprises a pressure reduction valve that is configured to set pressure of the fuel gas stream to that required by the inlet of the turbine to be fueled. The system preferably comprises a second backpressure valve that is configured to send the portion of the fuel gas stream back to the inlet pressure reducing valve.

REFERENCE NUMBERS

Figure 1:
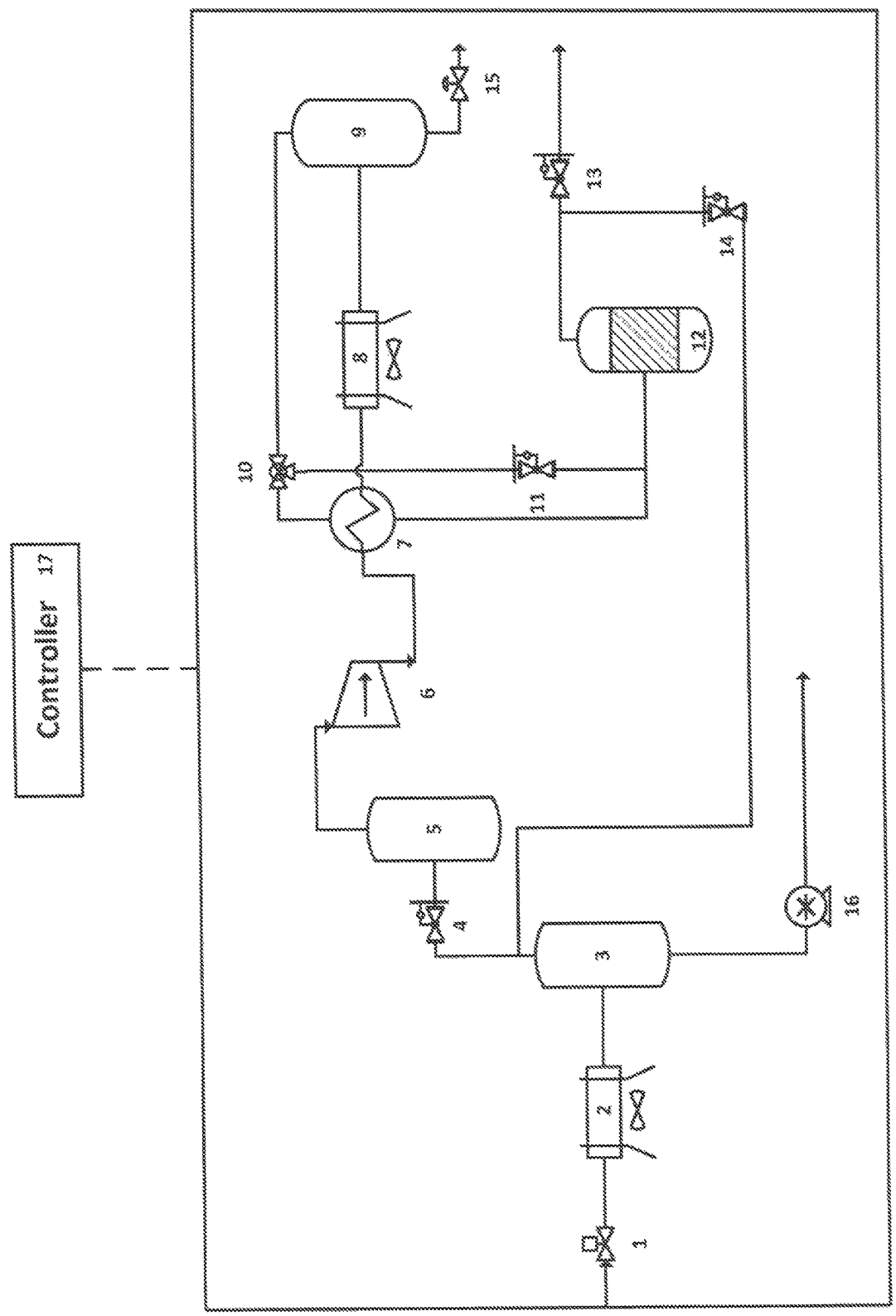
FIG. 1 is a system architecture diagram of the present invention.

1 Safety valve
2 Inlet aerial cooler
3 Inlet separator
4 Inlet pressure reducing valve
6 Scrubber
6 Compressor
7 Gas-to-gas heat exchanger
8 Post-compression aerial cooler
9 Post-compression separator
10 Control valve
11 First backpressure valve
12 Coalescing filter
13 Final pressure reduction valve
14 Second backpressure valve
15 Dump valve
16 Pump
17 Controller Note: Only the components shown in FIG. 1 (the system architecture diagram) are included in the above reference number list.

DETAILED DESCRIPTION OF INVENTION

A. Overview

To process gas to make it useable in turbines, the gas stream must be compressed to specific turbine fuel pressure and either cooled or heated to temperature requirements while staying above the dewpoint of the gas. These conditions will vary by turbine manufacturer; therefore, equipment meant for the treatment of turbine fuel must be able to adjust to varying parameters.

In general, the components of natural gas to condense first are the components with the lowest vapor pressure. Vapor pressure is the pressure at which the liquid state of a compound is in equilibrium with its vapor state for a certain temperature. If the system pressure is more than the vapor pressure, more liquid will form. If the system pressure is less than the vapor pressure, more vapors will form.

Vapor pressure is also a function of temperature. As the temperature decreases, so does the vapor pressure. To condense compounds found in natural gas, the gas pressure can be increased above the vapor pressure, the gas can be cooled, or both can occur. The present invention does both and can adjust system pressure and temperature to treat gas to a desired specification.

To condition the gas, compression, cooling, separation, reheating, and pressure control are used. By using a logic or automation controller to control motors, gas pressure and temperature, parameters can be input by an operator, and "treated" fuel gas will be produced by the system.

In instances where fuel gas is not required, such as when the turbine is not running, the present invention can send the treated gas through a recycle loop. By using digital control and implementing a recycle, the equipment is able to have instantaneous treated gas for varying fuel demands for a wide variety of turbines. Other technologies available today are not able to control independently the pressure and temperature of the gas being fed to a turbine, nor are they able to deliver the gas at, a temperature that is a specified number of degrees from the dewpoint of the gas ("dewpoint spread") at the pressure at which the gas is supplied to the turbine.

Existing technology usually incorporates either pressure reduction or compression alone. The present invention solves this problem by controlling both temperature and pressure while ensuring that the gas is above its dewpoint. By utilizing skid- or trailer-mounted components, the present invention accomplishes this in a compact mobile package that can be deployed to any location where gas treatment is necessary to supply acceptable fuel for a gas-fired turbine B. Detailed Description of the Figures The first step of the process is for raw gas to pass through the safety valve 1, as shown in FIG. 1. Here the valve is opened to allow gas to pass through to the next step of the system when the equipment is powered on and all the site safeties are in their operational range. When the system is off or a safety shutdown is initiated, this valve prevents gas from entering the equipment.

From here, the raw gas passes through an inlet aerial cooler 2. The inlet aerial cooler 2 cools the raw gas to an input temperature setpoint. If the gas is rich enough or has water vapor, the gas may condense some water and natural gas liquids (NGLs). These produced liquids are then removed by an inlet separator 3. Next, the raw gas is passed through the inlet pressure reducing valve 4, which adjusts the gas to a pressure acceptable for the compressor to be used. The raw gas then flows through a scrubber 5, which captures any liquids before the gas enters the compressor 6. The compressor 6 can be of any type common to natural gas compression, such as an oil-flooded screw compressor, a reciprocating compressor, a liquid ring compressor, or a centrifugal compressor. During the compression operation, the pressure of the gas is elevated to a pressure above the desired pressure for the inlet of the turbine to be fueled, creating compressed gas.

Compressed gas, at an elevated temperature due to the heat of compression, is then used as a heat source to heat the final treated gas to the desired temperature above the dewpoint in a gas-to-gas heat exchanger 7. Compressed gas is sent to a post-compression aerial cooler 8 and cooled to set a temperature lower than the required dewpoint of the gas at fuel delivery pressure. The cooled compressed gas is then sent to a post-compression separator 9, where liquids are removed from the gas stream. The cooled compressed gas is then reheated to a set temperature by sending a portion of the cooled compressed gas through a gas-to-gas heat exchanger 7 using a control valve 10 that controls the amount of cooled compressed gas to be reheated. The remaining cooled compressed gas passes through the first backpressure valve 11 before being blended with the gas that was heated, creating the fuel gas stream. This addition of heat brings the fuel gas within the temperature specification of the turbine and moves the gas away from its dewpoint.

The fuel gas then passes through a coalescing filter 12 to remove any last liquids before passing through a final pressure reduction valve 13 that sets the pressure of the fuel to be sent to the turbine. A second backpressure valve 14 is used to recycle any excess gas that is not being consumed by the turbine back to the inlet pressure reducing valve 4. This process ensures that the system will always have more gas available for fueling than the turbine will be consuming. Liquids produced at the inlet and post-compression separators 3, 9 are removed from the system using a dump valve 15 or a pump 16, both of which will send the liquids to off-skid storage or disposal. The controller 17 monitors and maintains the steady operation of the equipment and may be a programmable logic controller (PLC), a programmable automation controller (PAC), or other digital control system.

Figure 2:
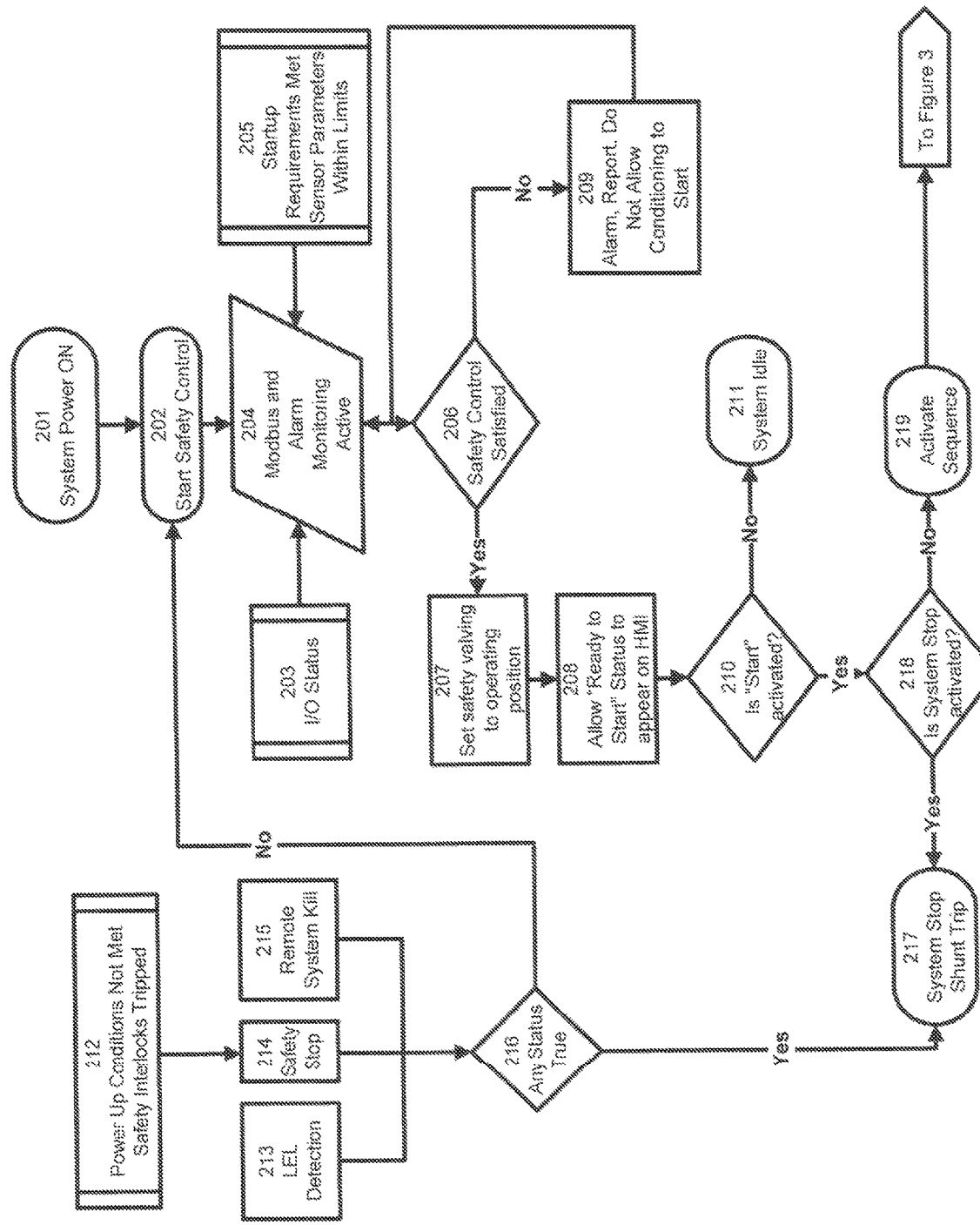
FIG. 2 is a first flow diagram of the programming sequence of the present invention.

FIG. 2 through 7 are flow diagrams of the programming sequence of the present invention. As shown in FIG. 2, when initial power is applied, the controller begins the boot-up process 201. The controller then initializes the monitor for correct configuration and begins checking safety stop interlocks, combustible gas detection, and remote modbus values. If all initial values are within allowed parameters, the controller allows system startup 202. Both analog and digital inputs and outputs used for control and operational decisions are used by the controller. Discrete switch positions, analog temperatures, valve positions, and pressures are monitored by the controller 203. The controller continually monitors conditions to ensure ongoing safe operation 204. At step 205, the controller assesses whether start-up requirements have been met based on both operator input (for example, as to system configuration and parameters for high and low limits) and sensor parameters (for example, regarding the state of the system).

If all preceding safety criteria are satisfied, the system transitions from startup to processing 206. As long as the safety control 206 is satisfied, the safety valve 207 will set to its operating position, and the "Ready to Start" icon will appear on the human-machine interface (HMI) 208. The system can stay in this mode indefinitely until the start icon is toggled. If at any time the safety status is no longer satisfied, the "Ready to Start" icon disappears, and the alternate path 209 is invoked until the issues are cleared 207. In the event that the safety control is no longer satisfied, alarms are generated, and a report is cued for send out to the remote monitoring network. An inhibit is also fed back into the process to prevent startup or continued operation 209, and at that point, the controller monitors the status of the "Ready to Start" hit 210.

If the system is ready to run (i.e., the "Ready to Start" icon appears), but the "° Ready to Start" icon has not been pressed, the process will remain in "idle" mode indefinitely 211. Hardware safety interlocks must be satisfied to allow power to be applied to the system. This includes level switches, emergency stop push button switches, and lock out/tag out switches 212. A combustible gas detection (CGD) sensor is located in the same physical electrical enclosure as the controller; this enclosure is separate and apart from the system described above. The CGD sensor monitors for a threshold of twenty percent (20%) or greater of the lower explosive limit (LEL) to send a shutdown notice 213. Any of the safety interlocks from box 211 that fail will send a shutdown notice 214 to the controller, which then initiates the shutdown process. The remote telemetry service (i.e., satellite connection) is also capable of sending a shutdown notice 21S to the controller.

If one of these inputs 213, 214, 215 shows a fault in startup 216, the controller sends a signal to shunt trip the main breaker to shut down the system 217. These three inputs are monitored by the controller whenever the system is in operation. The controller also monitors the system stop button 218. At any time, if the system stop 218 is pressed after a start command has been initiated, the controller sends a signal to shunt trip the main breaker to shut down the system. If the start command has been initiated 210, and there are no faults in startup, the sequence to transition from startup to raw gas conditioning 219 is activated.

Figure 3:
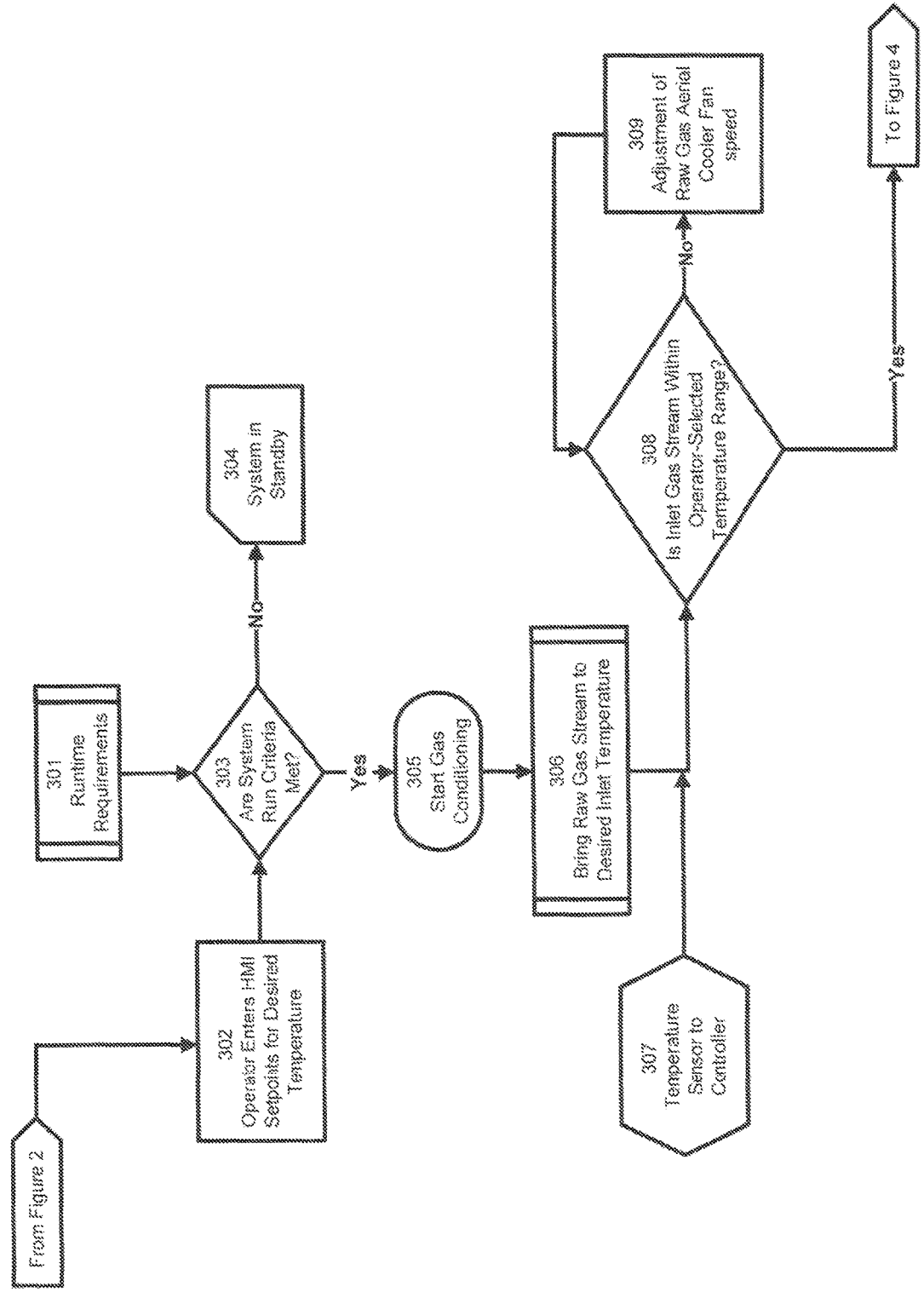
FIG. 3 is a second flow diagram of the programming sequence of the present invention.

As shown in FIG. 3, there are additional criteria that must be met beyond the startup requirements in order for the system to proceed past the "idle" or "standby" state. These criteria include reservoir oil, liquid levels, or deltas between ambient and media (gas stream) values 301. These values may not necessitate a system shutdown, but they may require suspension of system operation until the values are within an acceptable range. On the HMI, the operator will input the required parameters and setpoints 302 specific to the turbine, including, but not limited to, temperature of the fuel gas.

As noted in the preceding paragraph, a preconfigured list of runtime requirements must be met before starting the raw gas conditioning 303. The system can stay in standby mode waiting for values to come into compliance with requirements 304. When all requirements—both startup (see FIG. 2) and runtime 301—are met, the controller will start gas conditioning by activating the inlet aerial cooler 305. The gas stream is then cooled to a desired temperature by passing it through the inlet aerial cooler 306. A sensor reads the gas inlet temperature and transmits that data to the controller to ensure that raw gas reaches the setpoint temperature 307. If the raw gas is already at or below the pre-selected temperature 308, the raw gas may pass through to the next process. If needed, the controller will adjust the fan speed on the inlet aerial cooler 309.

Figure 4:
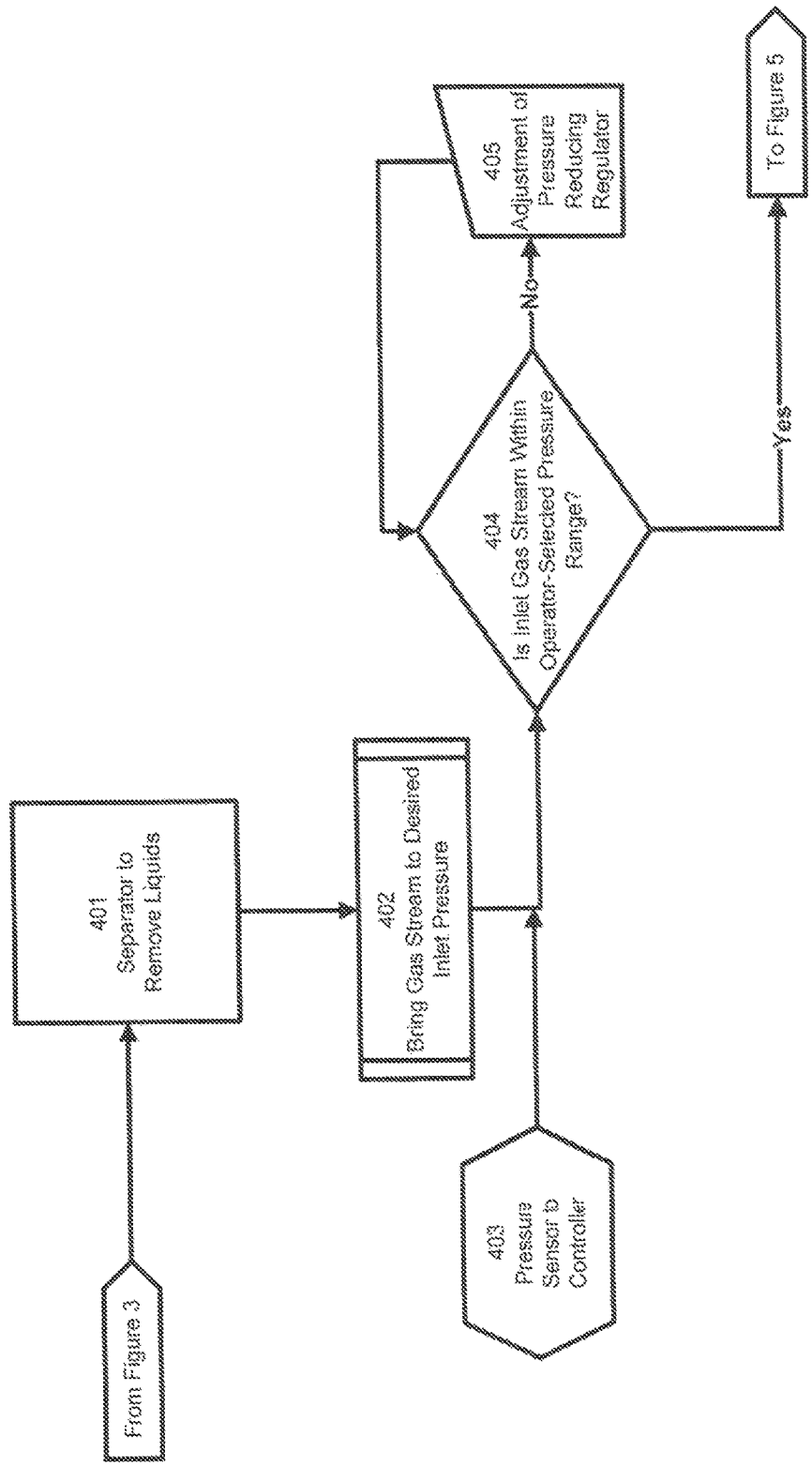
FIG. 4 is a third flow diagram of the programming sequence of the present invention.

As shown in FIG. 4, any liquids produced are then removed 401 (by the inlet separator 3) before the raw gas is then brought to the desired inlet pressure 402. A pressure sensor 403 reads the pressure of the gas and sends a signal to the controller. If the gas is already at or below the desired pressure 404, the pressure-reducing valve will remain open. If the pressure requires further adjustment, the controller will send a signal 405 to adjust the pressure-reducing valve or prompt the operator to adjust the valve.

Figure 5:
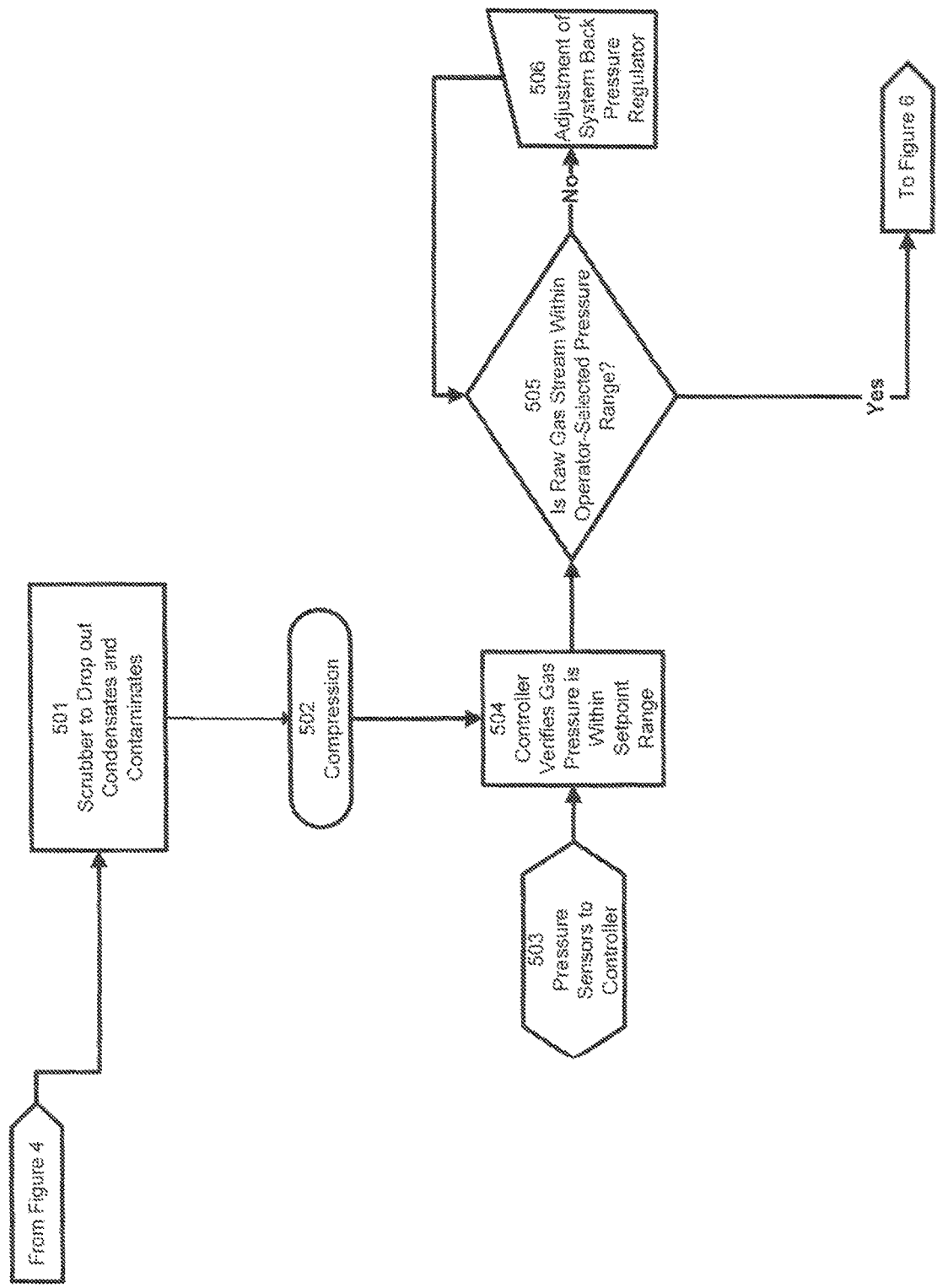
FIG. 5 is a fourth flow diagram of the programming sequence of the present invention.

In FIG. 5, a scrubber 501 first removes any remaining condensates and contaminates from the raw gas before the raw gas proceeds to compression 502. A pressure sensor reads the pressure of the raw gas and sends a signal to the controller 503. The controller then verifies that the gas is within the specified setpoint range 504. If the gas is not within setpoint range 505, the controller sends a signal to adjust the system backpressure regulator or alerts the operator to adjust the backpressure regulator 506.

Figure 6:
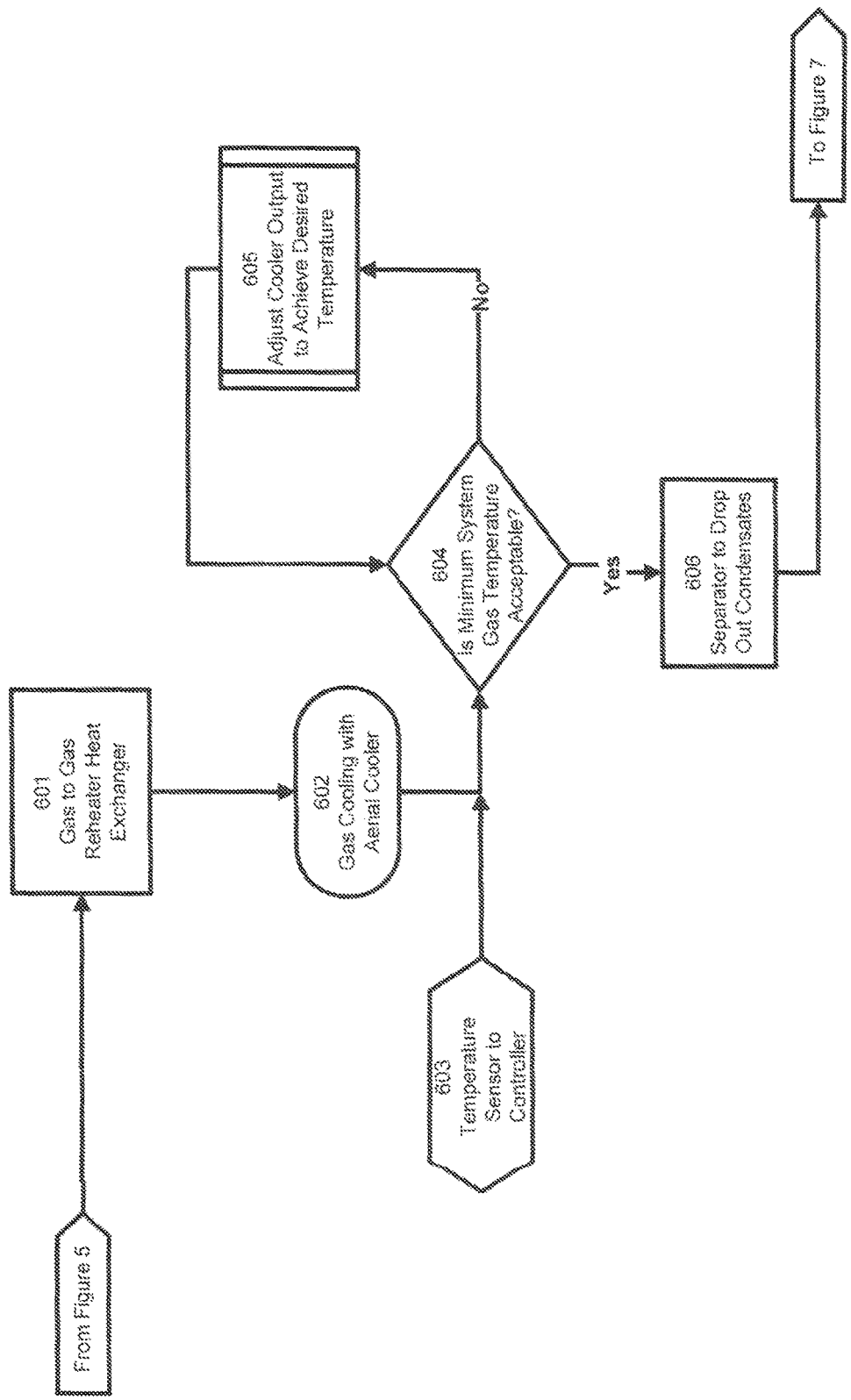
FIG. 6 is a fifth flow diagram of the programming sequence of the present invention.

As shown in FIG. 6, compressed gas then passes through a gas-to-gas reheat exchanger 601 before proceeding to the post-compression aerial cooler 602. Here a temperature sensor reads the temperature out of the post-compression aerial cooler 603 and determines if the compressed gas has reached an acceptable minimum system temperature as input by the operator 604. The controller will then vary the speed of the motor on the post-compression aerial cooler to achieve the desired outlet temperature 605. From here the cooled compressed gas then passes through a separator (namely, the post-compression separator 9) to drop out any liquids that may have formed 606.

Figure 7:
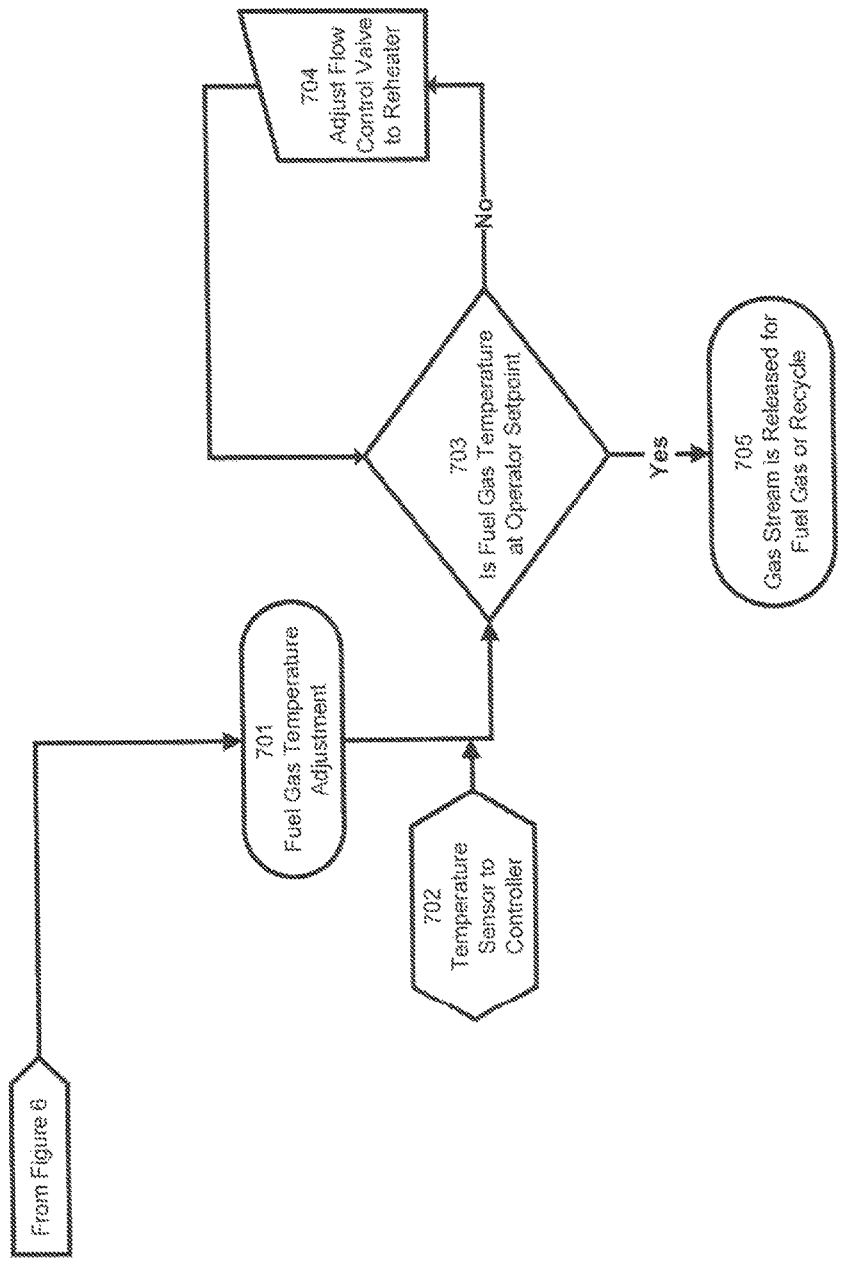
FIG. 7 is a sixth flow diagram of the programming sequence of the present invention.

In FIG. 7, fuel gas temperature adjustment is performed 701. A temperature sensor reads the temperature of the fuel gas and sends a signal to the controller 702. The controller then determines if the fuel gas temperature is at the setpoint input by the operator 703 and will adjust a flow control valve 704 that will alter the ratio of flow cooled compressed gas through the gas to gas reheat exchanger crossing with previously compressed gas. After these streams have blended and the temperature is determined to be at the operator setpoint, the gas is released for fuel gas or to be recycled 705.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for treating gas for the purpose of fueling turbines, the method comprising the steps of:
   (a) providing a stream of raw gas;
   (b) passing the stream of raw gas through an inlet pressure reducing valve that is configured to adjust the stream of raw gas to a pressure suitable for a compressor;
   (c) passing the stream of raw gas through a scrubber that is configured to capture liquids from the stream of raw gas;
   (d) passing the stream of raw gas through a compressor that is configured to bring the stream of raw gas to a pressure above that required by an inlet of a turbine to be fueled, thereby creating compressed gas;
   (e) sending the compressed gas to a post-compression aerial cooler that is configured to cool the compressed gas to a temperature lower than a required dewpoint at fuel delivery pressure, thereby generating cooled compressed gas;
   (f) removing natural gas liquids from the cooled compressed gas by passing the cooled compressed gas through a post-compression separator;
   (g) sending a first portion of the cooled compressed gas through a gas-to-gas heat exchanger via a control valve, thereby creating heated compressed gas;
   (h) sending a second portion of the cooled compressed gas through a first backpressure valve; and
   (i) blending the heated compressed gas with the second portion of the cooled compressed gas to create a fuel gas stream with a desired delivery temperature.

2. The method of claim 1, comprising the additional step of passing the stream of raw gas through an inlet aerial cooler that is configured to cool the stream of raw gas to an input temperature setpoint.

3. The method of claim 1, comprising the additional step of removing natural gas liquids from the stream of raw gas by passing the stream of raw gas through an inlet separator.

4. The method of claim 1, comprising the additional step of passing the fuel gas stream through a coalescing filter that is configured to remove liquids from the fuel gas stream.

5. The method of claim 1, comprising the additional step of passing the fuel gas stream through a pressure reduction valve that is configured to set pressure of the fuel gas stream to that required by the inlet of the turbine to be fueled.

6. The method of claim 1, further comprising the step of passing a portion of the fuel gas stream through a second backpressure valve that is configured to send the portion of the fuel gas stream back to the inlet pressure reducing valve.

7. The method of claim 1, further comprising the step of removing liquids produced by the post-compression separator via a dump valve.

8. The method of claim 1, further comprising the step of removing liquids produced by the post-compression separator via a pump.

9. The method of claim 3, further comprising the step of removing liquids produced by the inlet separator via a dump valve.

10. The method of claim 3, further comprising the step of removing liquids produced by the inlet separator via a pump.

11. A system for treating gas for the purpose of fueling turbines comprising:
   (a) an inlet pressure reducing valve that is configured to adjust pressure of a stream of raw gas to a pressure suitable for a compressor;
   (b) a scrubber that is configured to capture liquids from the stream of raw gas;
   (c) a compressor that is configured to bring the stream of raw gas to a pressure above that required by an inlet of a turbine to be fueled, thereby creating compressed gas;
   (d) a post-compression aerial cooler that is configured to cool the compressed gas to a temperature lower than a required dewpoint at fuel delivery pressure, thereby generating cooled compressed gas;
   (e) a post-compression separator that is configured to remove natural gas liquids from the cooled compressed gas;

(f) a gas-to-gas heat exchanger that is configured to heat a first portion of the cooled compressed gas, thereby creating heated compressed gas;

(g) a first backpressure valve that is configured to receive a second portion of the cooled compressed gas; and (h) tubing that is configured to blend the heated compressed gas with the second portion of the cooled compressed gas to create a fuel gas stream with a desired delivery temperature.

12. The system of claim 11, further comprising an inlet aerial cooler that is configured to cool the stream of raw gas to an input temperature setpoint.

13. The system of claim 11, further comprising an inlet separator that is configured to remove natural gas liquids from the stream of raw gas.

14. The system of claim 11, further comprising a coalescing filter that is configured to remove liquids from the fuel gas stream.

15. The system of claim 11, further comprising a pressure reduction valve that is configured to set pressure of the fuel gas stream to that required by the inlet of the turbine to be fueled.

16. The system of claim 11, further comprising a second backpressure valve that is configured to send the portion of the fuel gas stream back to the inlet pressure reducing valve.

* * * * *